United States Patent [19]

Sanders et al.

[11] Patent Number: 6,105,946
[45] Date of Patent: Aug. 22, 2000

[54] APPARATUS FOR SUPPORTING AND LIFTING A WORKPIECE

[75] Inventors: Donald E. Sanders; Jesse L. Henson, both of Urbana, Ohio

[73] Assignee: Garber Seeder Company, St. Paris, Ohio

[21] Appl. No.: 09/213,217

[22] Filed: Dec. 17, 1998

[51] Int. Cl.[7] .................................................. B23Q 3/00
[52] U.S. Cl. .............................. 269/17; 269/60; 269/99
[58] Field of Search ................... 269/17, 60, 99

[56] References Cited

U.S. PATENT DOCUMENTS

| 1,624,361 | 4/1927 | Ow . | |
|---|---|---|---|
| 2,514,563 | 7/1950 | Todd | 187/9 |
| 2,737,709 | 3/1956 | Lovelace | 29/290 |
| 2,895,567 | 7/1959 | Hall | 187/9 |
| 4,705,264 | 11/1987 | Hawkins et al. | 269/17 |
| 4,725,183 | 2/1988 | Smillie, III | 414/345 |
| 4,919,236 | 4/1990 | Karlsson et al. | 187/25 |
| 5,339,704 | 8/1994 | Lindberg | 74/89.15 |
| 5,472,180 | 12/1995 | Bent | 269/99 |
| 5,662,307 | 9/1997 | Lentine | 248/640 |
| 5,857,660 | 1/1999 | Lentine | 248/640 |

OTHER PUBLICATIONS

Company advertising pamphlet for Garber Lift, Garber Seeder, Inc., 1997.

*Primary Examiner*—David A. Scherbel
*Assistant Examiner*—Lee Wilson
*Attorney, Agent, or Firm*—Biebel & French

[57] ABSTRACT

An apparatus for supporting and lifting a workpiece includes a base, an upwardly extending column fixed to the base, a screw rotatably mounted on the base parallel to the column, a motor operatively coupled to the screw for rotating the screw, and a carriage threadedly engaging the screw and slidably engaging the column. A variety of chucks or support mechanism for engaging various types of workpieces may be removably coupled to the carriage. The apparatus advantageously allows supporting and lifting at least a portion of a marine outboard motor.

2 Claims, 10 Drawing Sheets

APPARATUS FOR SUPPORTING AND LIFTING A WORKPIECE

BACKGROUND OF THE INVENTION

1. Field of the Invention

This invention relates to an apparatus for supporting and lifting a workpiece. In particular, the invention relates to an apparatus for supporting and lifting at least a portion of a marine outboard motor.

2. Discussion of Background

Objects to be worked upon, or workpieces, are often bulky or heavy, and pose challenges as to their handling by the person performing the work. In particular, outboard marine motors, and portions thereof, must be supported and lifted in such a way as to provide a worker with easy access to the object to be worked upon, while maintaining the object in a secure "hands free" position.

There have been previous efforts to design devices for supporting and lifting workpieces. For example, in U.S. Pat. No. 2,514,563, issued to Todd, there is described an electric hoist structure having a platform movable up and down by a motor and screw arrangement. The hoist structure also includes a wheeled base for moving the hoist.

In U.S. Pat. No. 2,737,709, issued to Lovelace, there is described an apparatus for handling work that includes a carriage driven vertically by a motor and screw. Mounted to the carriage is a work table having a clamp. The motor and screw are attached to a pivotable column to permit lateral rotational movement of the work table.

However, there is still a need to provide a means for supporting and lifting workpieces that have unusual or awkward shapes, or are heavy. Particularly, there is a need for a means for supporting and lifting workpieces having a variety of different shapes or configurations in an economical manner.

SUMMARY OF THE INVENTION

The present invention is directed to these and other problems by providing a base having an upwardly extending guide column. Mounted for rotation on the base, in parallel relation to the column, is a threaded shaft or screw. A motor secured to the column is connected to drive the screw. Secured to the screw by means of a threaded nut is a carriage. The carriage also engages the column in sliding relationship. The carriage has extending laterally therefrom a female portion comprising a first short section of steel pipe adapted to receive therein in cooperating telescoping fashion a male portion carried on a variety of different mounting chucks or support means.

A first support means includes a planar member attached to a male portion comprising a second section of steel pipe proportioned to fit inside the carriage female portion. The planar member is adapted to engage workpieces having clamps and may be made of wood. For example, the planar member may be proportioned to accommodate the clamps of an outboard motor.

A second support means or mounting chuck includes a base plate welded to a male portion. Pivotally connected to the base plate are a plurality of elongated brackets having lengthwise slots therethrough. Threaded fasteners or screws received within the slots are adapted to engage threaded recesses or holes in a workpiece. For example, an engine block of an outboard motor may be mounted on the chuck by threading the screws into holes in the block.

A third support means includes a pair of laterally extending, parallel, spaced apart forks connected to a male portion. The forks include an upper clamping member adjustably secured to a lower fork member. A workpiece may be clamped between the two forks by clamping portions of the workpiece between the clamping members and the fork members. For example, the port and starboard extending edges or planes of an outboard motor cavitation plate may be so mounted.

A fourth support means includes an upwardly extending cylindrical finger attached to a male portion. The finger may be proportioned to be received snugly within a workpiece recess or hole. One such workpiece might be an outboard motor crankshaft having a cylindrical recess in one end thereof.

Accordingly, an object of this invention is to provide an apparatus for supporting and lifting a workpiece.

Another object of the invention is to provide an apparatus for supporting and lifting a workpiece having interchangeable support means for mounting various workpieces.

Yet another object of the invention is to provide an apparatus for supporting and lifting a workpiece capable of being moved easily from one place to another place.

Other objects and advantages of the invention will be apparent from the following description, the accompanying drawings and the appended claims.

DETAILED DESCRIPTION OF THE PREFERRED EMBODIMENT

Figure 1:
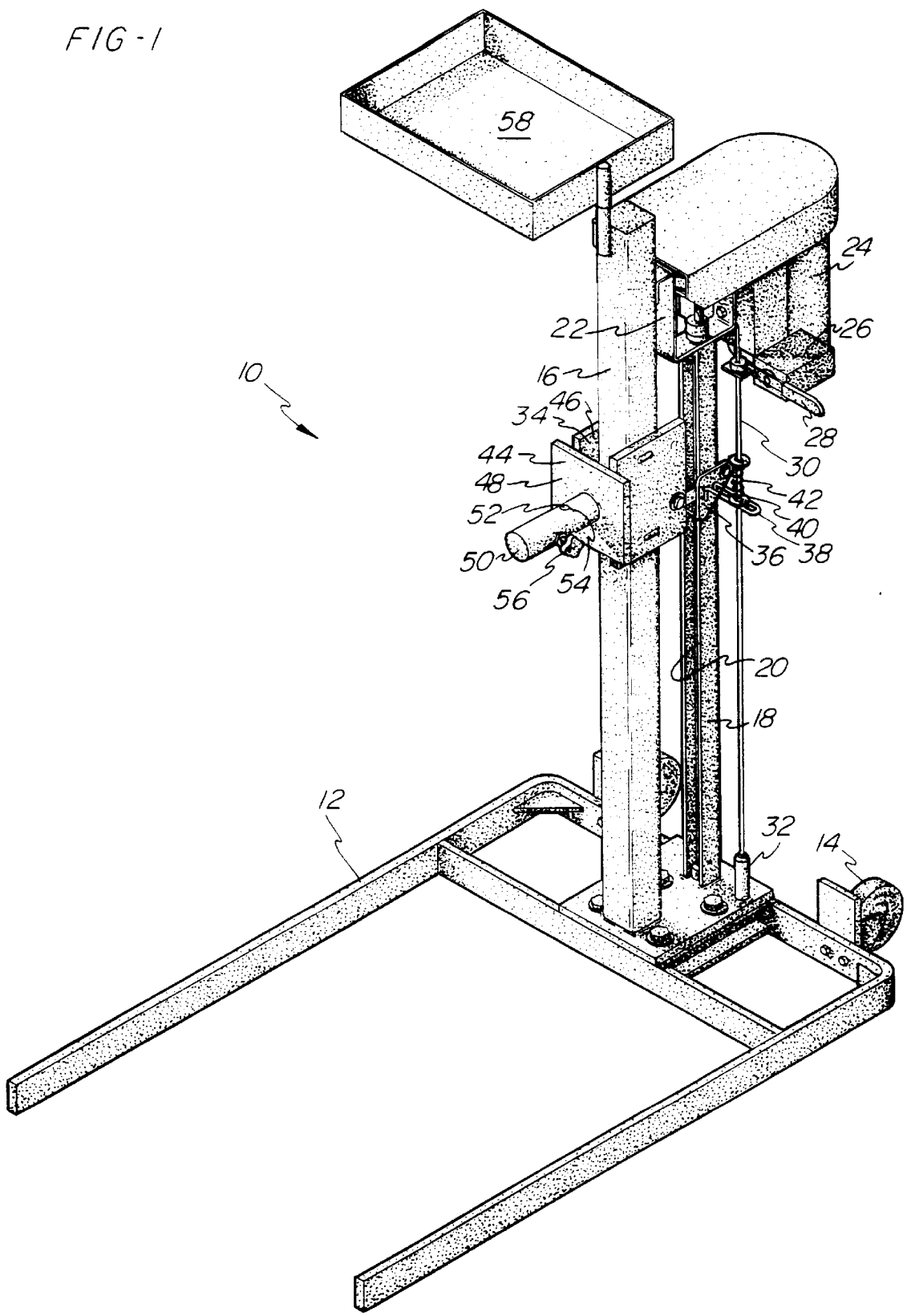
FIG. 1 is a perspective view of a preferred embodiment of the apparatus of he invention.

Referring initially to FIG. 1, there may be seen a preferred embodiment of an apparatus for supporting and lifting a workpiece 10. The lift 10 includes a substantially rectangular base 12 made of heavy gauge steel. Mounted along a rear edge of the base 12 are a pair of wheels 14 for moving the lift 10 easily from one place to another.

Mounted to the base 12 and extending substantially vertically upwardly therefrom is a column 16. The column 16 comprises a steel tube having a rectangular cross-section. Also extending upwardly from the base 12 substantially parallel to the column 16 is a support rail 18. The rail 18 is made of heavy gauge steel and has a substantially C-shaped or square cross-section open on one side. Disposed within the rail 18 is a threaded steel rod or screw 20. The screw 20 is rotatably mounted on the base 12 and extends upwardly substantially parallel to the column 16. Joining the top of the rail 18 to the column 16 in rigid connection is a substantially L-shaped heavy gauge steel bracket 22. An upper end of the screw 20 is mounted for rotation in the bracket 22.

Mounted to the bracket 22 and column 16 is an electric motor 24. The motor 24 is operatively connected to the upper end of the screw 20, as by a belt or gear system (not shown), for imparting rotation to the screw 20. A switch 26 for supplying electrical energy to the motor 24 is also affixed to the bracket 22. The switch 26 has a three-position pivotable lever arm 28 that may be set to UP, OFF, and DOWN positions. Suspended from one end of the lever arm 28 is a rod 30. A lower end of the rod 30 is slidably received within a guide bracket 32 mounted on the base 12.

A carriage 34 threadedly engages the screw 20 and slidably engages the column 16. The carriage 34 comprises a rear or screw engaging portion 36 having a substantially C-shaped or square cross-section proportioned to be received about the rail 18. The rear portion 36 includes an internally threaded portion (not shown) adapted to be received about the screw 20 in threaded engagement. Extending laterally from the screw engaging portion 36 is a rigid steel loop 38 within which is slidably received the rod 30. Coaxial with the rod 30 in sliding engagement therewith, and resting upon the loop 38, are a pair of steel washers 40 separated by a spring 42.

The carriage 34 also comprises a front or column engaging portion 44 including a pair of steel side plates 46 detachably rigidly connected to the rear portion 36. A front mounting plate 48 is welded to the side plates 46. The side plates 46 and mounting plate 48 cooperate to fit the column 16 in sliding engagement. Welded to the front mounting plate 48 and extending substantially horizontally and forwardly therefrom is a female portion or chuck coupling tube 50. The female portion 50 includes a hole or first coupling pin aperture 52 formed therethrough for receiving a coupling pin 54, and a second side hole threaded to receive a set screw having a knurled knob 56 attached thereto. A tray 58 may optionally be pivotally attached to the column 16 for holding tools, small parts, and the like.

Figure 2:
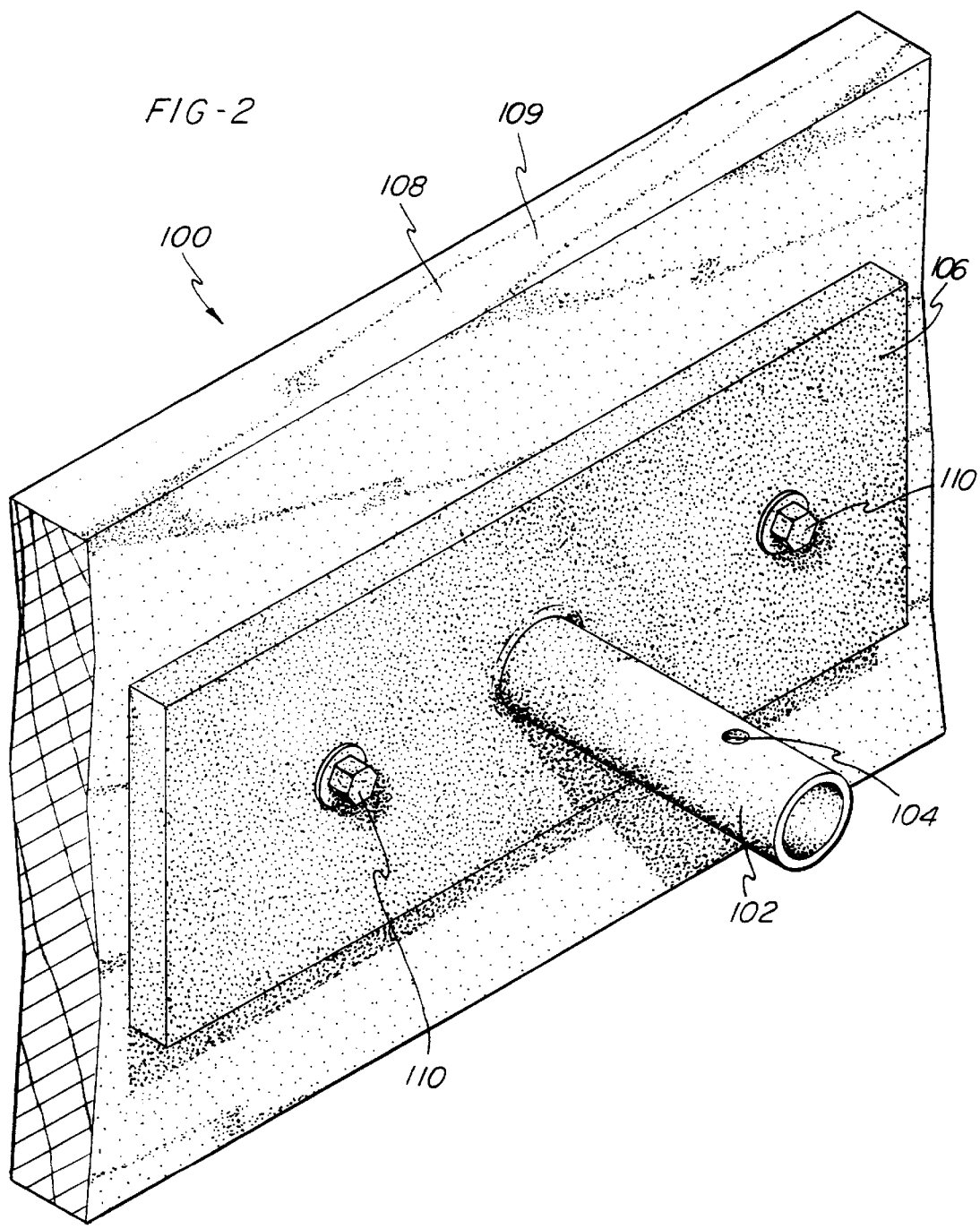
FIG. 2 is an isometric view of a first embodiment of a support means of the invention.

Turning now to FIG. 2, there may be seen a first embodiment 100 of a workpiece support means or chuck of the invention. The first chuck 100 includes a male portion 102 proportioned for releasable engagement with the chuck coupling tube 50 of the carriage 34. The male portion 102 of the first chuck 100 is a circular steel tube having an outer diameter sized to just slide into the female portion 50. While the coupling tube 50 and male portion 102 are both depicted as being cylindrical, they could have a variety of cross-sectional shapes, such as square, so long as they fit in cooperating telescoping relationship. The male portion 102 includes a hole or second coupling pin aperture 104 formed therethrough adapted to be aligned with the hole 52 of the female portion 50 and receive the coupling pin 54 therein. A rectangular steel mounting plate 106 is welded to the end of the male portion 102. While the female portion 50 is depicted as being carried on the carriage 34 and the male portion on the support means 100, the respective structures could be interchanged so that the male portion would be carried on the carriage 34 and the female portion would be carried on the support means or chuck 100.

A rectangular, rigid, substantially planar member or block 108, having an attachment edge 109 oriented substantially upwardly, is bolted to the plate 106 by means of a plurality of threaded fasteners or bolts 110. The block 108 is made of wood, but may be made of other suitable materials such as, for example, without limitation, aluminum, steel, polycarbonate, polypropylene, or polytetrafluoroethylene. The block 108 is of such a width and thickness so as to permit workpieces to be clamped thereto. For example, the block 108 may be of a predetermined thickness so as to simulate the transom or rearmost portion of a boat, thereby accommodating the mounting clamps of a marine outboard motor.

Figure 3:
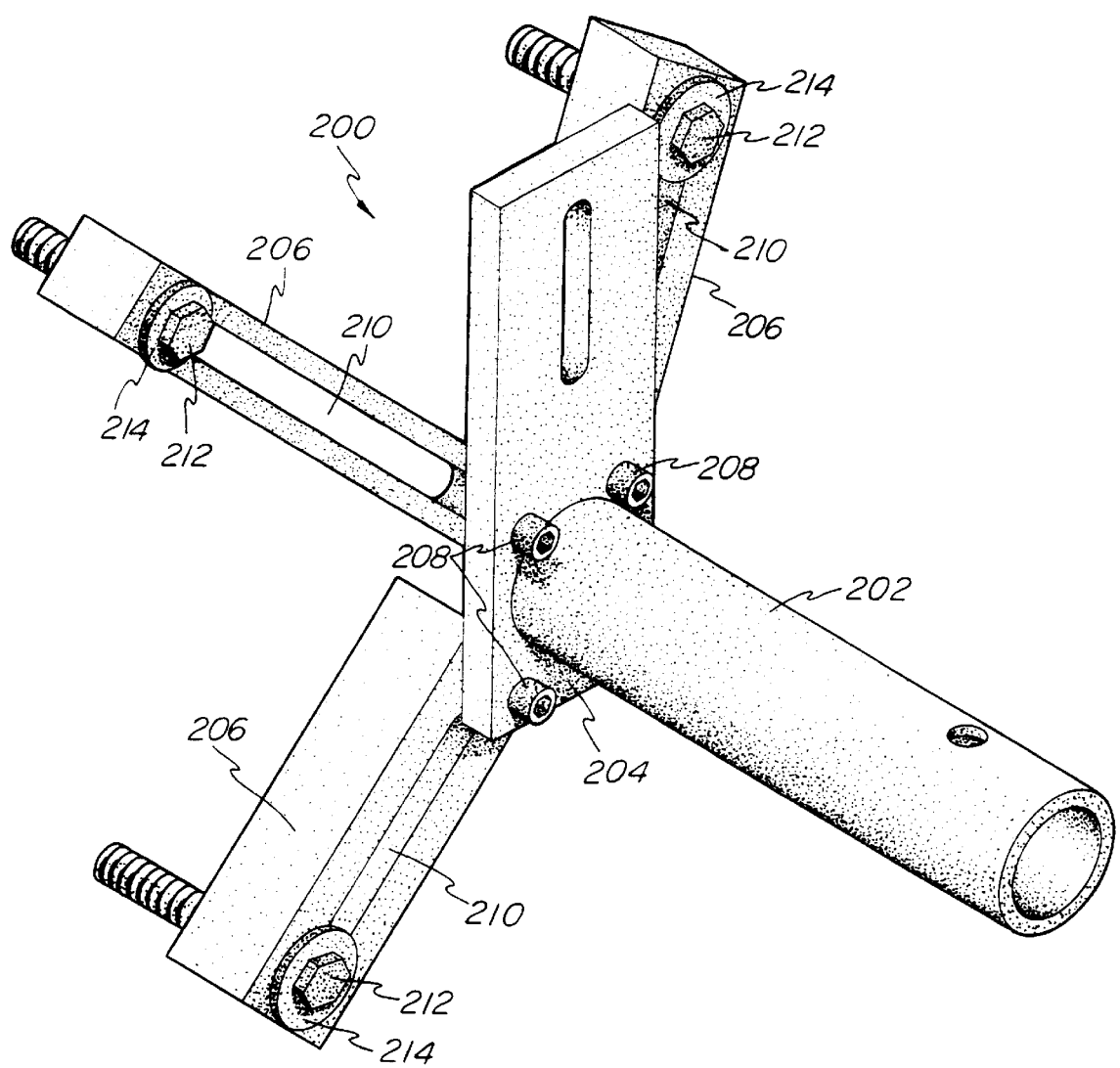
FIG. 3 is an isometric view of a second embodiment of a support means of the invention.
Figure 4:
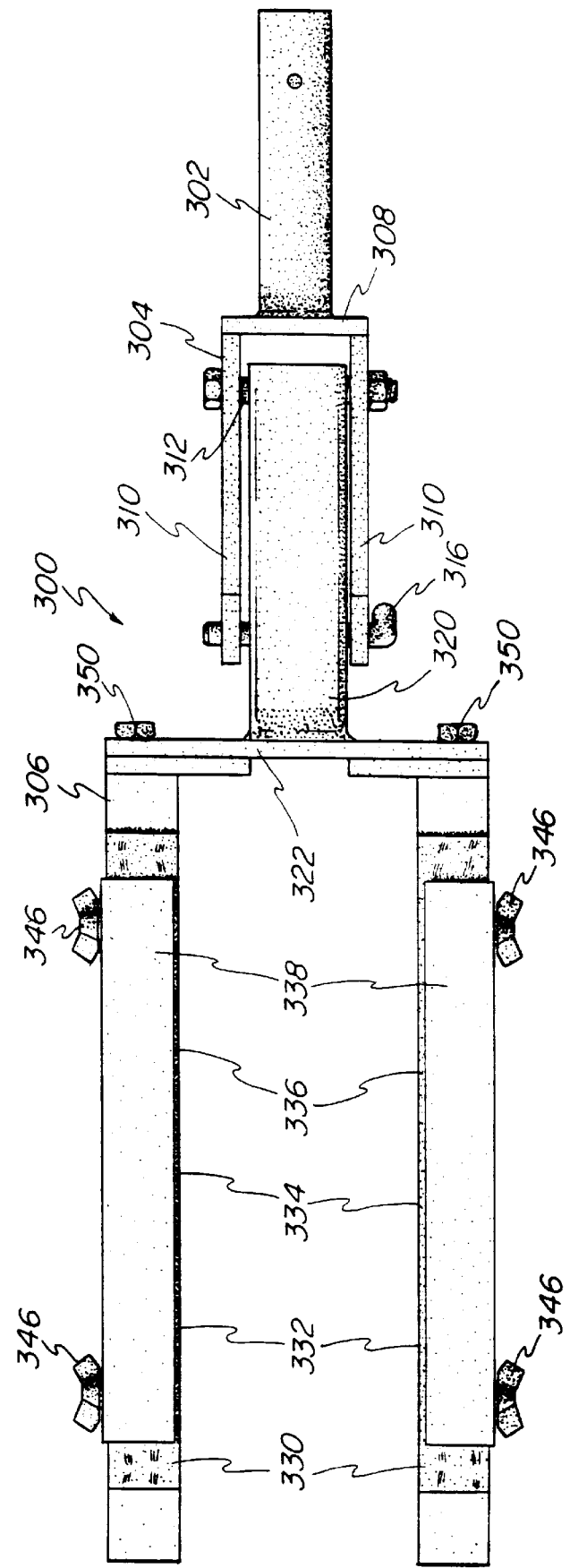
FIG. 4 is a top plan view of a third embodiment of a support means of the invention.
Figure 5:
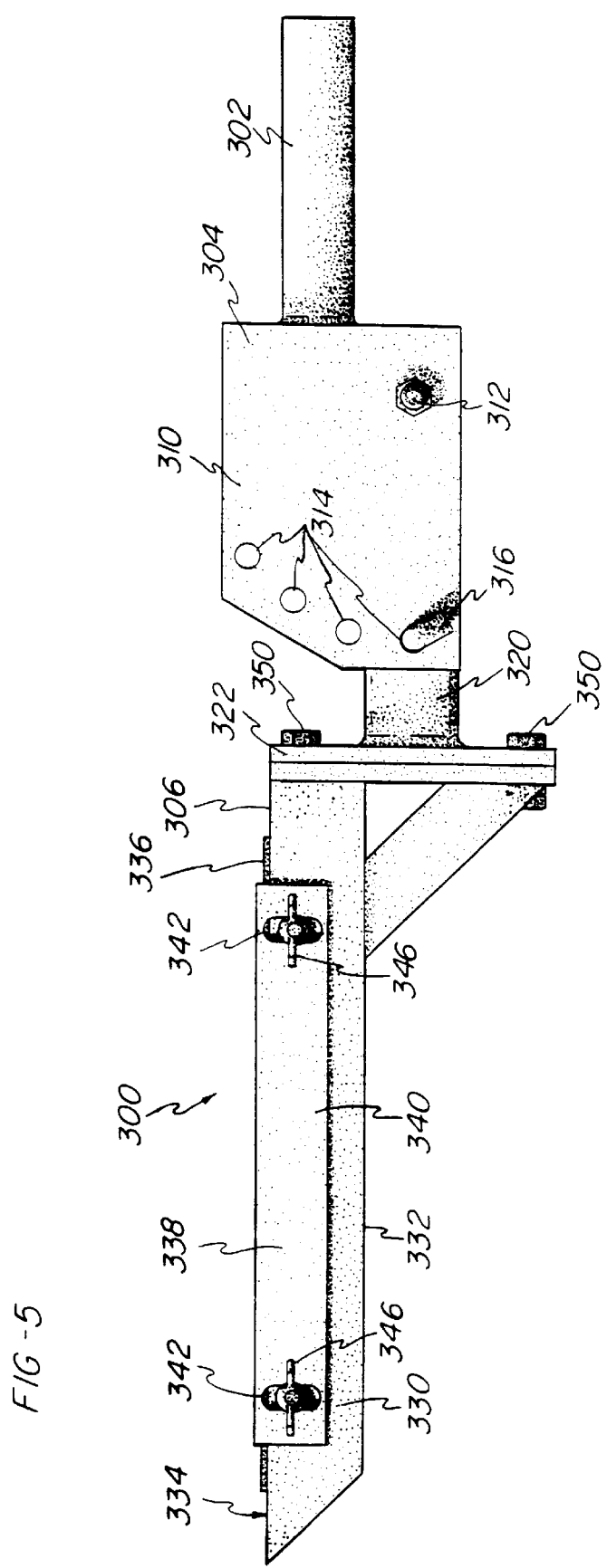
FIG. 5 is a side elevation view of the support means of FIG. 4.
Figure 6:
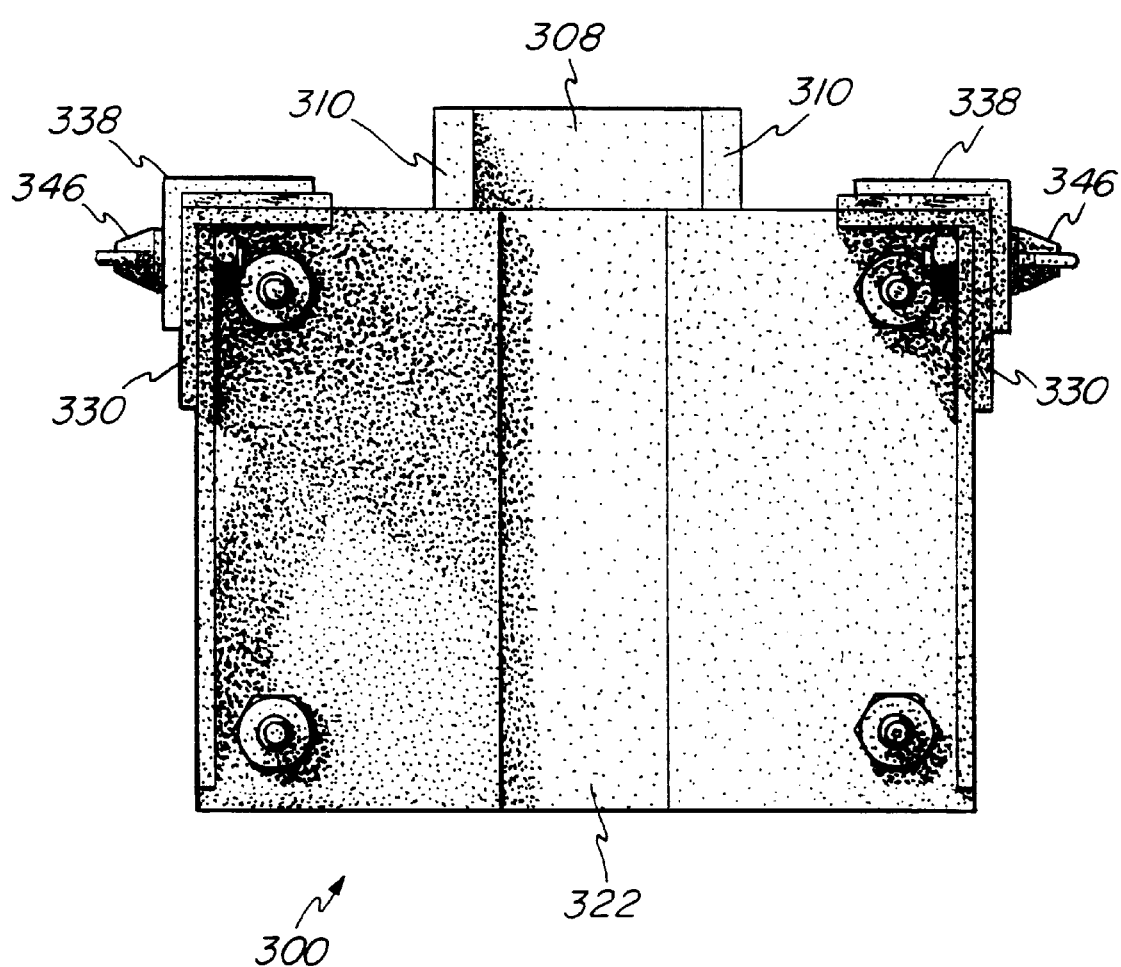
FIG. 6 is a front elevation view of the support means of FIG. 4.
Figure 7:
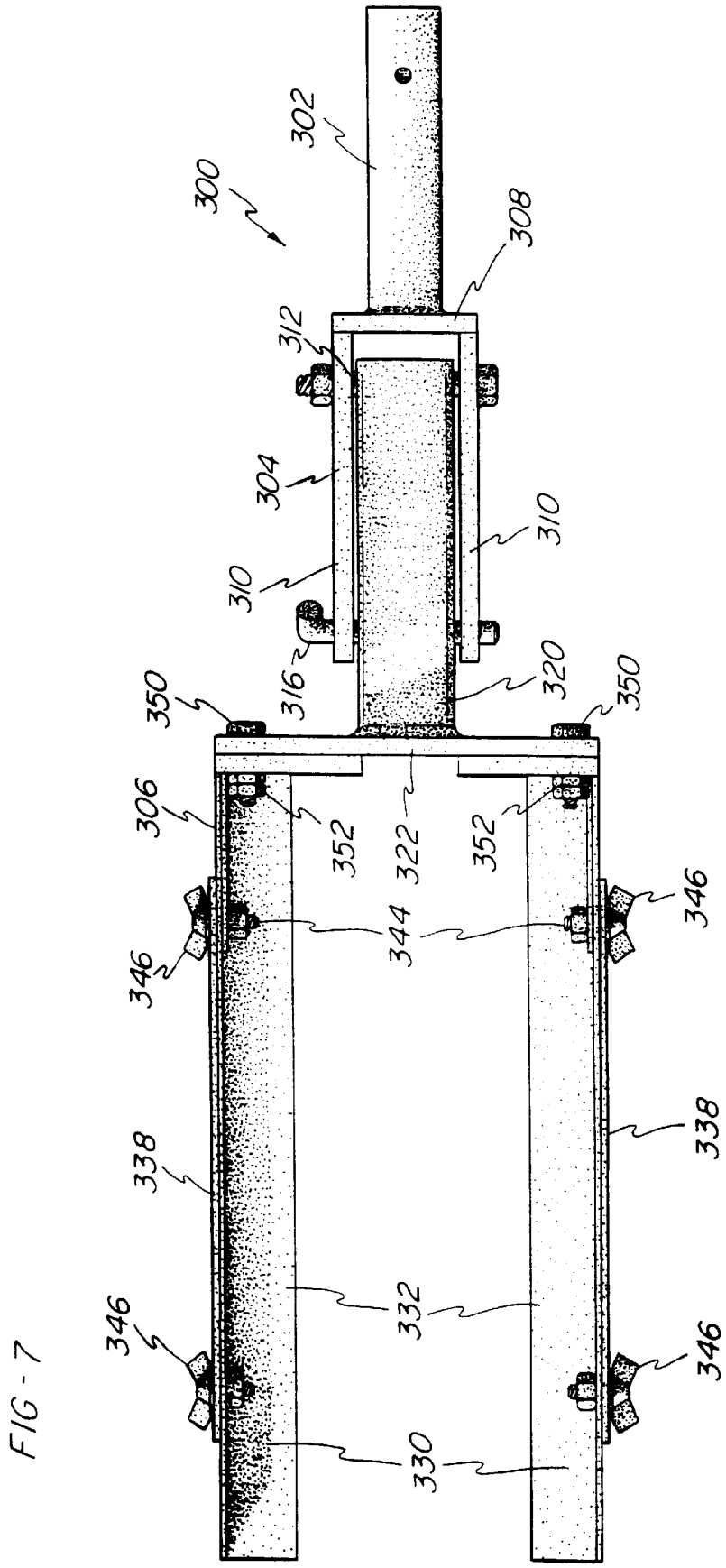
FIG. 7 is a bottom plan view of the support means of FIG. 4.

A second embodiment 200 of a workpiece support means or chuck of the invention may be seen in FIG. 3. The second support means 200 includes a male portion 202 substantially similar to the male portion 102 of the first chuck 100. A rectangular, steel base plate 204 is welded to the male portion 202. The second chuck 200 also includes a plurality of elongate mounting brackets 206 pivotally connected at one end to the base plate 204 by means of threaded fasteners 208. Each bracket 206 is machined from aluminum and includes a lengthwise channel or slot 210 therethrough. Received within each channel 210 is a threaded fastener or bolt 212 and washer 214. Each fastener 212 may optionally be held in its respective channel 210 by a fastener retaining means (not shown) such as a spring clip or the like.

Each fastener 212 is adapted to threadably engage a corresponding threaded hole or recess of a workpiece to be supported and lifted. For example, without limitation, the fastener 212 may be threaded into the holes of a marine motor engine block which normally receive the motor engine head retaining bolts.

A third embodiment 300 of a workpiece support means or chuck of the invention is depicted in FIGS. 4–8. As may be seen therein, the third support means or chuck 300 includes a male portion 302 that is substantially similar to the first chuck male portion 102. The third chuck 300 comprises a carriage coupling assembly 304 and a fork assembly 306 for supporting and lifting a workpiece. The carriage coupling assembly 304 includes the male portion 302 welded to a box-like structure including a rear steel base plate 308 and a pair of welded steel side plates 310. A pair of pivot holes through the side plates 310 near the base plate 308 have received therethrough a pivot pin or bolt 312. Spaced radially equidistantly from the pivot holes along an arc are a plurality of through-holes 314 in the side plates 310 adapted to receive therethrough a removable steel retaining pin or bolt 316.

The fork assembly 306 includes a steel pivot coupling assembly 320 welded to a steel base plate 322. The pivot coupling assembly 320 comprises a steel tube having a square cross-section and includes a pair of pivot holes therethrough in alignment and adapted to receive therethrough the pivot pin 312, and a pair of retaining pin holes in alignment and adapted to receive therethrough the retaining pin 316. Thus, the pivot coupling assembly 320 is pivotally connected to the carriage coupling assembly 304 by means of the pivot pin 312, and may be adjusted to a plurality of angular elevations corresponding to the through-holes 314. The pivot coupling assembly 320, and carriage coupling assembly 304, including pivot pin 312, through-holes 314, and retaining pin 316, comprise elevation angle positioning means disposed between the fork assembly base plate 322 and the male portion 302.

A pair of forks 330 extend forwardly from the base plate 322 in substantially parallel, spaced apart arrangement. Each fork 330 includes a forwardly extending fork member 332 formed from angle iron and having a substantially L-shaped cross section. The fork member 332 includes a substantially flat upper surface 334 covered with a cork material 336 for protecting workpiece surfaces and improving frictional engagement with workpieces. The upper surface 334 may optionally be covered with rubber or some other like material, or may have any covering material omitted altogether.

A forwardly extending clamping member 338 having a substantially flat lower surface is secured to the fork member 332. The fork member 332 and clamping member 338 are proportioned to releasably clamp a portion of a workpiece between the upper surface 334 and the clamping member 338 lower surface. The clamping members 338 have a substantially L-shaped cross section including a side portion 340. The lower surfaces of the clamping members 338 may have cushioning material thereon similar to the cork or rubber material on the fork members 332. The side portions 340 of the clamping members 338 have a pair of spaced vertically oriented elongate slots 342 therethrough adapted to receive threaded fasteners 344 secured to the fork members 332. Wing nuts 346 threaded on the fasteners 344 permit rapid adjust of the clamping members 338 relative to the fork members 332 to accommodate workpieces of varying thickness.

The forks 330 are secured to the base plate 322 by means of threaded fasteners 350 and nuts 352 extending through holes in the fork members 332 aligned with horizontally oriented elongated slots (not shown) in the base plate 322. The horizontally oriented elongated slots permit the spacing between the forks 330 to be adjusted to accommodate workpieces having differing widths.

Figure 8:
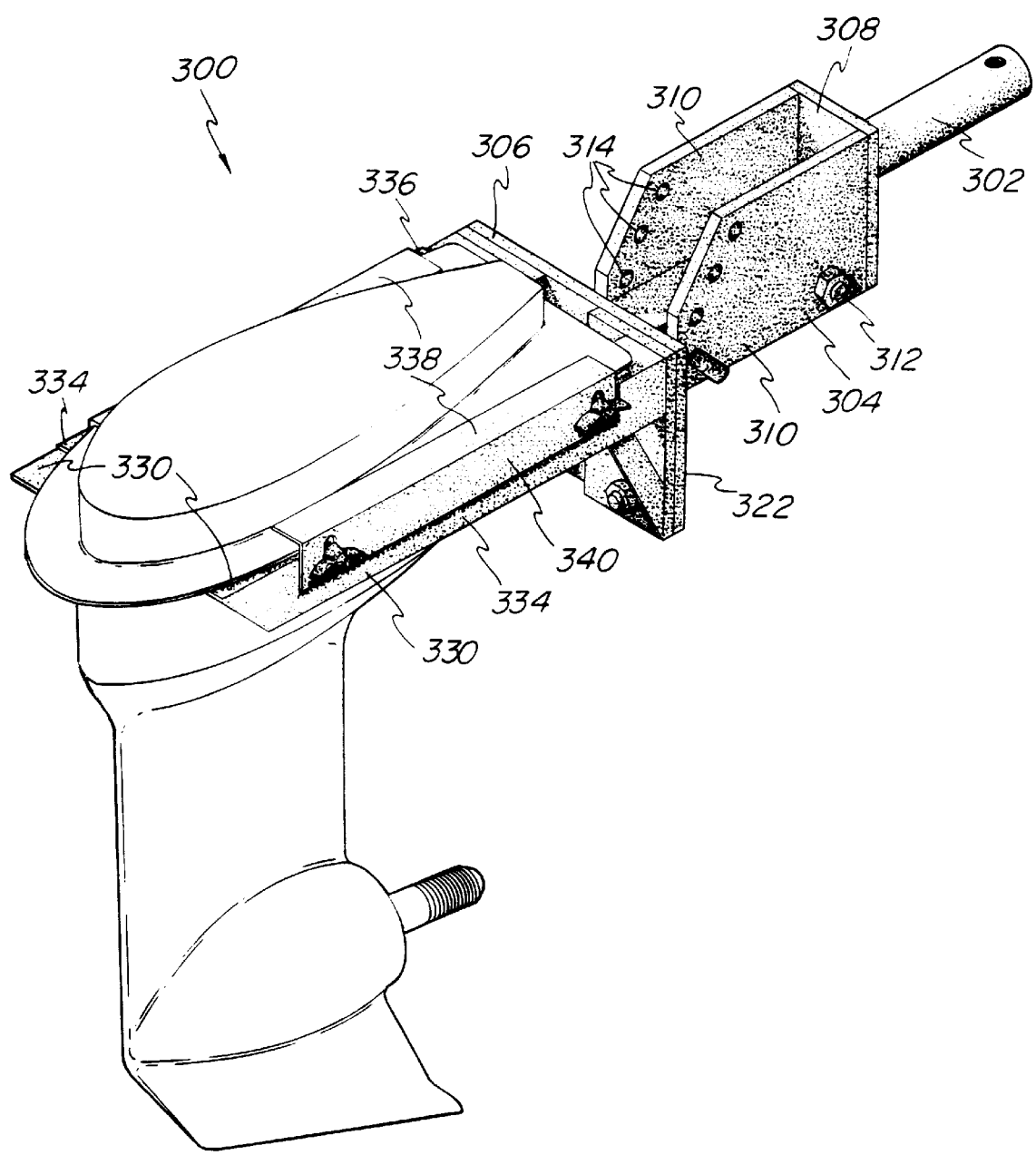
FIG. 8 is an isometric view of the support means of FIG. 4.
Figure 9:
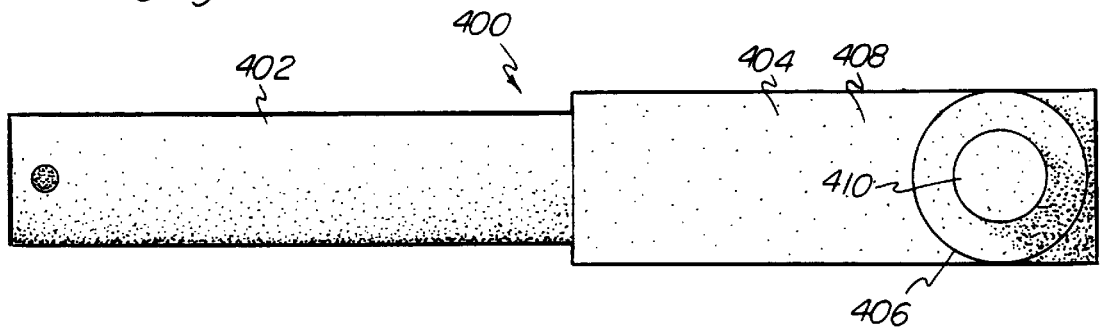
FIG. 9 is a top plan view of a fourth embodiment of a support means of the invention.
Figure 10:
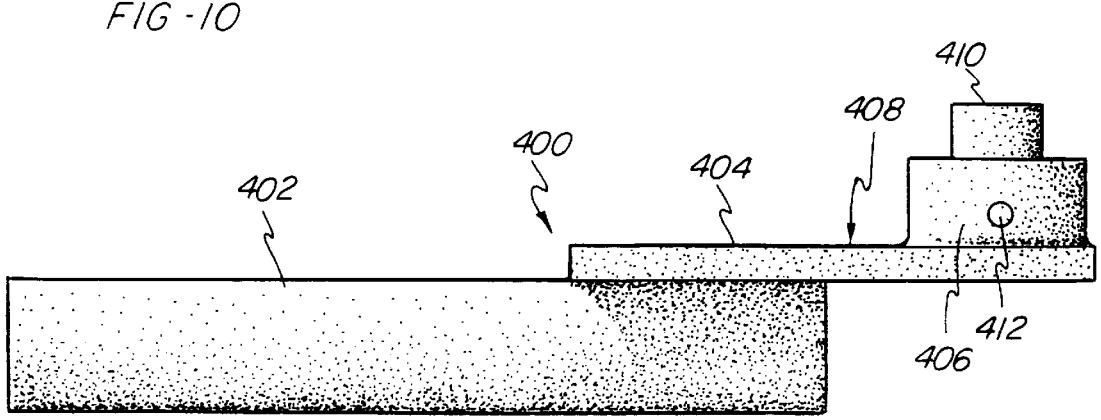
FIG. 10 is a side elevation view of the support means of FIG. 8.
Figure 11:
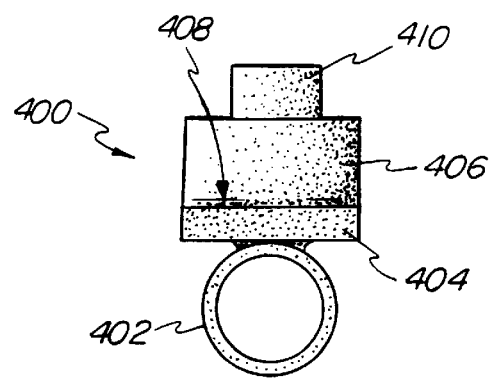
FIG. 11 is a front elevation view of the support means of FIG. 8.
Figure 12:
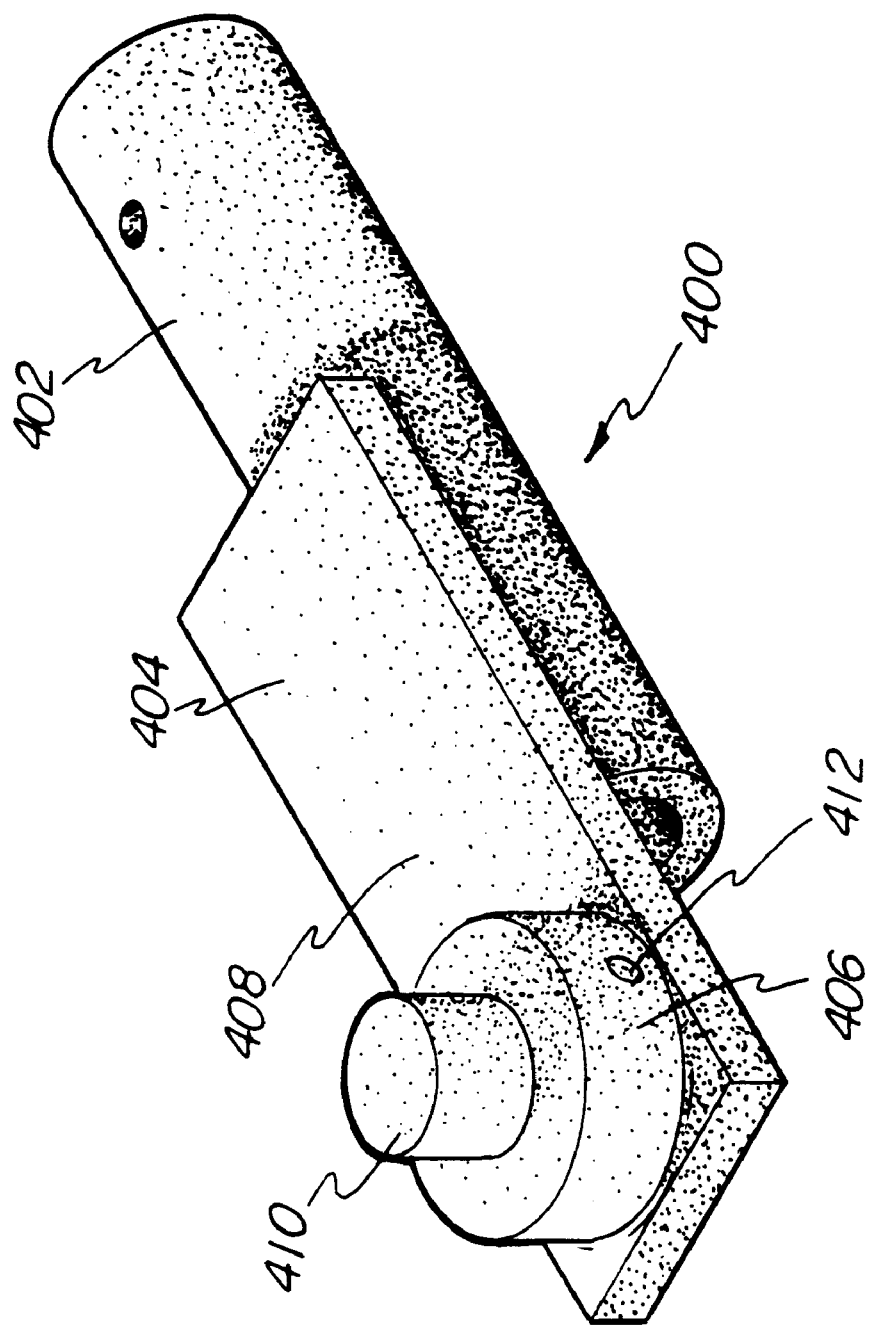
FIG. 12 is an isometric view of the support means of FIG. 8.

In FIG. 8, there may be seen a lower portion of a marine outboard motor supported securely by the third chuck 300. A laterally extending flange that may be a splash or cavitation plate is clamped between the clamping members 338 and the fork members 332. The weight of the lower portion of the motor is supported by the fork members 332. An individual performing work on the marine motor lower portion may easily adjust the workpiece to a desired elevational angle and operate the motor 24 of the invention to raise and lower the workpiece to a desired height.

Turning next to FIGS. 9–12, there is depicted a fourth embodiment of a workpiece support means or chuck 400 of the invention. The fourth chuck 400 includes a male portion 402 substantially similar to the first chuck male portion 102. In addition to the male portion 402, the fourth chuck 400 comprises a forwardly or longitudinally extending metal plate 404 welded to the male portion 402, an annular disk-shaped metal collar 406 welded to an upper surface 408 of the plate 404, and a metal finger 410 extending from the center of the collar 406 substantially perpendicularly to the plate 404, the finger 410 secured within the collar 406 by means of a set screw 412. The finger 410 may comprise brass, copper, aluminum, steel, or some such material, and may be solid or formed as a hollow tube or sleeve, and may be secured within the collar 406 by means of a set screw 412. The finger 410 is proportioned such that its length and outer diameter may be received snugly in sliding engagement within a corresponding recess or aperture of a workpiece to be supported or lifted. If the finger 410 is formed as a hollow tube or sleeve with an aperture or recess therein, the inner diameter may be proportioned so as to receive therein in snug fitting sliding engagement a correspondingly proportioned peg or protuberance of a workpiece. In particular, the finger 410 may be received within an aperture in the end of a marine outboard motor crankshaft.

In operation, an individual will normally select a desired one of the support means or chucks 100, 200, 300, or 400, depending on the nature of the workpiece to be supported and lifted, and couple the desired chuck to the carriage 34. The respective male portion 102, 202, 302, or 402 is inserted into the female portion 50 until the respective male portion second coupling pin hole is aligned with the female portion first coupling pin hole 52. The coupling pin 54 is then inserted into the holes to secure the male portion to the female portion. The knurled knob 56 may then be rotated so as to tighten the female portion set screw against the male portion. Optionally, if the coupling pin 54 is omitted, the respective desired workpiece chuck may be rotated within the female portion to a desired angular orientation. The set screw may then be tightened by means of the knurled knob so as to lock the chuck in the desired angular orientation.

Once a workpiece has been secured to the desired chuck, the workpiece may be lifted or lowered by means of the carriage 34 raised or lowered by the motor 24 driving the screw 20. To raise the workpiece, the lever arm 28 of the switch 26 is actuated to the UP position. Power is supplied to the motor 24 so as to cause rotation of the screw 20 in a direction to forcibly urge the carriage 34 with the workpiece in an upward direction. If the carriage 34 reaches the upper limit of its travel, the loop 38 forcibly urges the spring 40 and washers 42 against the end of the lever 28, thereby actuating the switch 26 to the OFF position and removing power to the motor.

To lower the workpiece, the lever arm 28 is actuated to the DOWN position. Power is supplied to the motor 24 so as to cause rotation of the screw 20 in a direction to forcibly urge the carriage 34 with the workpiece in a downward direction. If the carriage 34 reaches the lower limit of its travel, the loop 38 forcibly urges the rod 30 downwardly, thereby actuating the switch 26 to the OFF position.

If it is desired to move the apparatus of the invention, and optionally a workpiece, from one location to another, the apparatus may be tilted backwardly from vertical toward the wheels 14. The wheels 14 are adapted to support the combined weight of the workpiece, which may be as much as about 300 pounds (136 kg), and the workpiece supporting and lifting apparatus. The apparatus and workpiece may then be rolled from one location to another desired location.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. In an apparatus for supporting and lifting a workpiece of the type including a base; an upright column fixed to said base; a screw rotatably mounted on said base, said screw extending parallel to said column; a motor operatively connected to said screw for rotating said screw; a carriage adapted for travel relative to said column, said carriage having a screw engaging portion threadedly engaging said screw and a column engaging portion slidably engaging said column; support means for supporting said workpiece; and coupling means connecting said support means and said carriage for removably coupling said support means to said column engaging portion; the improvement wherein:

said coupling means includes a cooperating projecting member extending from said support means, a sleeve extending from said carriage, and a coupling pin, said projecting member slidably received in telescoping relation within said sleeve, said projecting member including a first coupling pin aperture therein, said sleeve including a second coupling pin receiving aperture therein, said first and second coupling pin receiving apertures aligned with said coupling pin received therein; and said support means further comprises a pair of substantially parallel, spaced apart, horizontally-extending forks secured to said projecting member, each said fork including a horizontally-extending fork member having a substantially flat upper surface, a horizontally-extending clamping member adjustably secured to said fork member and having a substantially flat lower surface, said fork member and said clamping member proportioned to releasably clamp a portion of said workpiece between said upper surface and said lower surface.

2. In an apparatus for supporting and lifting a workpiece of the type including a base, an upright column fixed to said base; a screw rotatably mounted on said base, said screw extending parallel to said column; a motor operatively connected to said screw for rotating said screw; a carriage adapted for travel relative to said column, said carriage having a screw engaging portion threadedly engaging said screw and a column engaging portion slidably engaging said column; support means for supporting said workpiece; and coupling means connecting said support means and said carriage for removably coupling said support means to said column engaging portion; the improvement wherein:

said coupling means including a projecting male portion and a cooperating female sleeve portion, said projecting male portion extending substantially horizontally from said support means, said female sleeve portion extending substantially horizontally from said carriage, said projecting male portion slidably received in telescoping relation within said female sleeve portion and releasably secured therein, said coupling means further comprising a coupling pin for releasably coupling said projecting male portion to said female sleeve portion, said female sleeve portion further comprising a first coupling pin aperture therein, said projecting male portion further comprising a second coupling pin aperture therein, said coupling pin being received within both said first aperture and said second aperture, said support means further comprising a pair of substantially parallel, spaced apart, horizontally extending forks secured to said projecting male portion, each said fork including a horizontally extending fork member having a substantially flat upper surface, a horizontally extending clamping member adjustably secured to said fork member and having a substantially flat lower surface, said fork member and said clamping member proportioned to releasably clamp a portion of said workpiece between said upper surface and said lower surface.

* * * * *